United States Patent
Jumelle

[15] 3,682,269
[45] Aug. 8, 1972

[54] DEVICE FOR REDUCING THE NOISE OF A GASEOUS JET

[72] Inventor: Louis Francois Jumelle, Ris-Orangis, France

[73] Assignee: Societe Nationale D'Etude Et De Construction De Moteurs D'Aviation, Paris, France

[22] Filed: April 19, 1971
[21] Appl. No.: 135,245

[30] Foreign Application Priority Data

April 21, 1970 France..................7014490

[52] U.S. Cl. ......181/33 HC, 181/33 HD, 239/127.3, 239/265.13, 239/265.17
[51] Int. Cl..........B64d 33/06, F01n 1/14, F01n 1/16
[58] Field of Search..........239/127.3, 265.11, 265.13, 239/265.17, 265.23, 265.25; 181/33 H, 33 HA, 33 HB, 33 HC, 33 HD, 33 R, 43, 51

[56] References Cited

UNITED STATES PATENTS

| 3,020,714 | 2/1962 | Eggers et al. | 239/265.23 |
| 3,027,714 | 4/1962 | Parker | 181/33 HC |
| 3,543,877 | 12/1970 | Ranvier et al. | 239/127.3 |

FOREIGN PATENTS OR APPLICATIONS 1,193,372    5/1970    Great Britain ........181/33 HC Primary Examiner—Robert S. Ward, Jr.
Attorney—William J. Daniel

[57] ABSTRACT

A device for reducing the noise emitted by a gaseous jet as it escapes from a pipe, particularly the noise of a propulsive jet of a jet powerplant such as a gas turbine jet propulsion engine, comprises a plurality of deflecting members distributed around the jet. These members are movable between inoperative positions, outside of the jet, to operative positions in which upstream-facing parts of the members penetrate into the jet. When operative each member thus acts in a scoop-like manner to deflect a fraction of the jet and give it an outwardly-directed transverse component of velocity to assist mixing with the surrounding air. In its upstream-facing part at least one of the deflecting members is equipped with means to inject, into the jet and in a direction possessing a component disposed transversely of the general direction of the jet, an auxiliary jet of pressurized auxiliary fluid.

8 Claims, 4 Drawing Figures

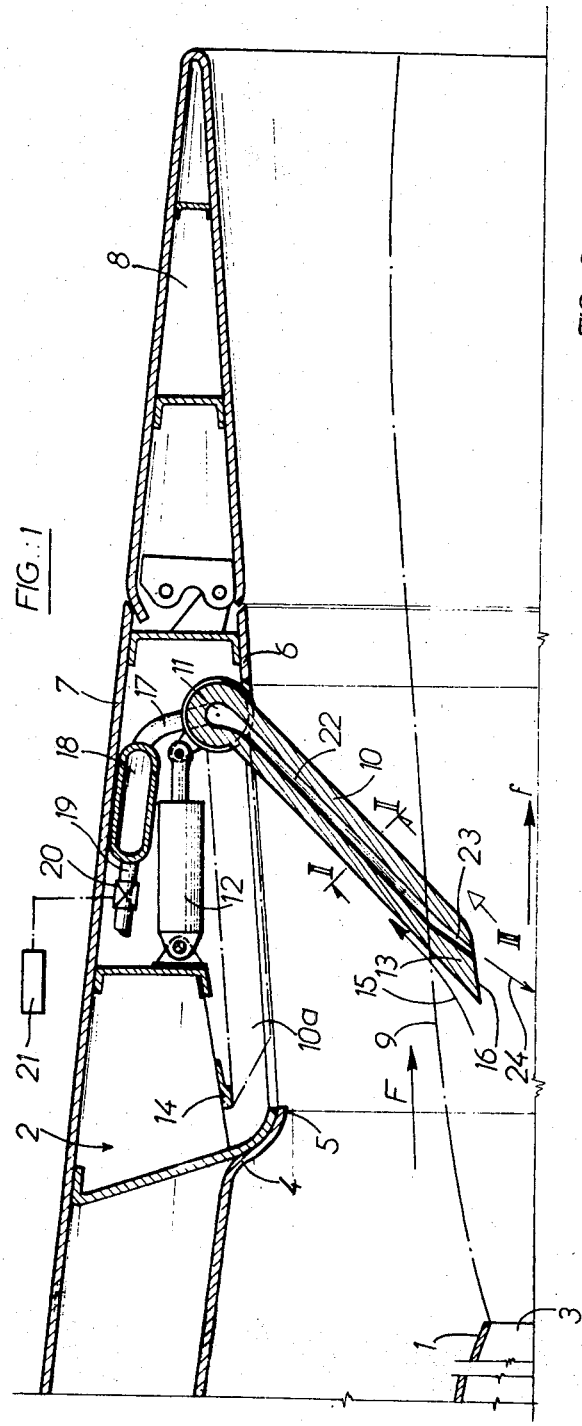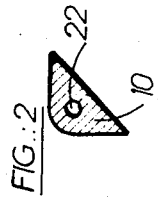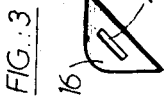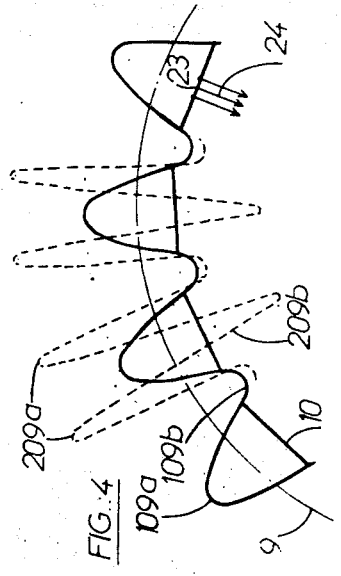

DEVICE FOR REDUCING THE NOISE OF A GASEOUS JET

This invention relates to a device for reducing the noise of a gaseous jet as it escapes from a pipe, and applies more particularly though not exclusively to deadening the noise produced during operation by a propulsive jet as it escapes from the exhaust system of a jet powerplant such as a gas turbine jet propulsion engine.

It is already known that one of the most effective means of attenuating the noise of a gaseous jet as it escapes from a pipe consists in increasing the surface of the zone in which the jet mixes with the surrounding air. Following on from this devices are already known which include, distributed around the jet to be muffled, a plurality of deflecting members movable between at least one operative position in which an upstream-facing part of each member penetrates into the jet in such a way as to bleed off and to deflect in a scooplike manner a fraction of the jet, which fraction is thus given an outwardly-directed transverse component of velocity, and an inoperative position in which they are retracted so as to lie outside the jet. In their operative position, the deflecting members or "scoops" modify, as can be appreciated, the periphery of the jet in a sense favorable to the acceleration of the mixing of the gases with surrounding air.

The invention aims in a general way at increasing the effectiveness of a device for reducing noise and of the foregoing general character, without any increase in the number of deflecting members or scoops required.

According to the invention, in such a device at least one of the deflecting members or scoops is equipped, in its upstream-facing part, with means to inject into the jet requiring muffling, in a direction possessing a component disposed transversely of the general direction of the jet, a jet of pressurized auxiliary fluid. Thus, in the zone itself in which the deflecting member or scoop causes the periphery of the gaseous jet to be deflected outwards, the jet of auxiliary fluid on the contrary exerts a constrictive effect which has the result of still further increasing the extent of the surface where mixing between the jet gases and the surrounding air takes place.

According to one arrangement of the invention, the means for injecting the jet of auxiliary fluid comprise a small nozzle which preferably possesses the form of a slot that is substantially peripheral, this making it possible to increase the active zone of the auxiliary jet.

According to a further arrangement of the invention, means are provided to adjust the flow-rate of the auxiliary fluid injected into the jet requiring muffling. It is thus possible, in particular, to adapt this flow-rate to the depth of penetration of the corresponding deflecting member or scoop into that jet in such a manner, for example, as to maintain the same overall effect when the depth of penetration varies.

The invention also covers exhaust systems, more especially for gas turbine jet propulsion engines, which systems are equipped with an improved noise-reducing device in accordance with the invention. In this case, the auxiliary fluid may with advantage be constituted by air originating in a compressor forming part of the jet engine and bled off, for example, at the discharge side of the engine compressor. In the case in which the exhaust system is of the type which includes a primary nozzle from which the jet requiring muffling is escaping, and a secondary fairing with a cross-section larger than that of the primary nozzle, the fairing partly surrounding this nozzle and extending downstream beyond the outlet orifice thereof, the deflecting members or scoops may to good advantage be mounted in such a way as to retract flush into the fairing when they are in the inoperative position.

The following description with reference to the accompanying drawings, which is given solely by way of example, shows one manner in which the invention may be put into effect. In the drawings:

FIG. 1 is a sectional view, taken on an axial plane, of the upper half of a jet exhaust system fitted with a noise-reducing device according to the invention;

FIG. 2 is a detail sectional view on the line II—II of FIG. 1, illustrating a deflecting member or scoop shown in FIG. 1;

FIG. 3 is an end view of said deflecting member in the direction of the arrow III in FIG. 1, and FIG. 4 is a diagram illustrating the functioning of the device according to the present invention.

In FIG. 1, the reference numeral 1 designates a pipe from which, during operation, there emerges at high velocity a gaseous jet the emission of noise from which it is desired to attenuate. In the example concerning the jet is a propulsive jet and the pipe forms part of an exhaust system constituting the rear terminal portion of a jet powerplant such as a gas turbine jet propulsion engine.

The exhaust system shown is of the type which comprises a primary nozzle, in principle a convergent and adjustable nozzle, made up of the pipe 1 and arranged coaxially with a secondary fairing 2 having a cross-section larger than that of the primary nozzle, and extending downstream beyond the outlet orifice, designated by the reference numeral 3, of the nozzle 1. The internal fairing wall comprises a convergent section 4, a throat 5 which is preferably located downstream of the outlet orifice 3, and a divergent section 6. The external wall of the fairing is designated by the reference numeral 7. In its downstream portion the fairing 3 terminates in adjustable flaps or "petals" 8.

During operation, the hot gases leaving the primary nozzle 1 at high velocity and at a pressure still high in the direction of the arrow $f$ form a divergent jet the boundary of which is shown in broken lines at 9. The annular space included between the inner wall of the secondary fairing 2 and the outer wall of the primary nozzle followed by the boundary 9 of the gaseous jet requiring muffling is traversed by a flow of secondary air represented by the arrow $f$.

Associated with this exhaust system is a silencer comprising a plurality of deflecting members 10 mounted so as to pivot around substantially tangential axes 11 accomodated within the fairing 2. Under the control of jacks 12, the members 10 may occupy either an operative or deployed position as shown in which they project into the jet $f$ each by means of an upstream-facing portion 13, or an inoperative or retracted position in which they are withdrawn away from the jet into the internal wall 6 of the fairing 2 which is apertured for this purpose. In the latter position, shown in broken lines at 10a, they rest against stops 14.

In the operative position, each of the deflecting members 10 bleeds off or strips away, as would a scoop, a fraction of the jet $f$ that is thus deflected with an outwardly-directed transverse component of velocity, as shown by the arrow 15. In order to attach the jet more effectively and to further the effect of "stripping away", the upstream-facing portion 13 of the deflecting members or scoops 10 preferably possesses, viewed in a section in an axial plane, a bevel-edged terminal surface 16.

The pivotal axes 11 of the deflecting members or scoops 10 are hollow, and each constitutes a rotary coupling. Fixed lengths of piping interconnect the successive couplings, the whole assembly forming, inside the fairing 2, an annular manifold which communicates by way of pipes 17 with an annular collector 18. The latter has a connection to a source of pressurized fluid (not shown), such as a bleed off the discharge side of a jet turbine engine compressor, by way of a pipe 19 in which there is interposed adjustable obturator means in the form of a valve 20. A control device 21 adjusts the opening of the valve 20 to the desired value.

Some at least of the deflecting members are equipped, in the lengthwise direction, with a duct 22 one end of which communicates with the annular manifold and the other end of which has port through the bevel-edged surface 16 in the form of a slot 23 with a peripheral general direction, as illustrated in FIG. 3.

In operation, when the deflecting members or scoops 10 are in operative position, the compressed air in the collector 18 passes through the pipes 17, the rotary couplings 11, the ducts 22, and the slots 23 to directly penetrate (within the propulsive jet $f$ in the form of flattened jets indicated by the arrow 24) having a great depth of penetration and directed transversely with respect to the general direction of the jet propulsive $f$.

With reference to FIG. 4, there will now be given in summary form an explanation, not of a limitative character, of certain phenomena which play a part in a silencer according to the invention. In that figure can be seen the boundary 9 of the undisturbed jet to be subjected to noise reduction. When the deflecting members 10 occupy their operative position, they cause a fraction of the jet to deviate outwards, this phenomenon giving rise, at the periphery of the jet, to a corresponding number of crests 109a separated by depressions 109b. The undulatory configuration obtained in this manner is favorable, as is well known, to the attenuation of the spread of noise from the jet.

When the small nozzles 23 are supplied with fluid, the jets of compressed air 24 each exert on the gaseous jet a local pneumatic constrictive effect which results in the emergence of a depression 209b bounded by two crests 209a which are higher and narrower than the crest 109a. Given an equal cross sectional area, and for an identical number of deflecting members or scoops 10, the gaseous jet requiring muffling thus possesses a surface-area in contact with the air that is considerably increased, this arrangement resulting in a muffling effect which is distinctly improved.

It will be noted that the penetration into the main jet $f$ of the small jets 24 of compressed air is facilitated by the fact that these small jets do not have to pass through the fraction of the main jet already "stripped away" by the deflecting members 10. The consequence is an increase in the depth of the active zone of the small jets 24, so that the process of mixing may reach into central portions of the main gaseous jet $f$ up to where it is usually difficult to penetrate.

Through adjusting the flow-rate of compressed air by means of the valve 20, it is possible to adjust the pneumatic constrictive effect to a selected value. In particular, it is thus possible to adapt the flow rate of compressed air to the depth of penetration of the deflecting members or scoops into the jet requiring muffling, with a view, for instance, to maintaining the same overall effect whatever the depth of penetration may be. On this subject, it will be noted that possible modifications to the depth of penetration of the deflecting members 10 may result either from a modification in the operative position of the said members (in the case of deflecting members with an adjustable inclination) or from a shifting of the boundary line 9 of the gaseous jet $f$ consequent upon, for instance, a modification in the rate of expansion of the said jet. It is thus possible, for example, to provide an adjustment in respect to two depths.

On another point, it will be noted that arrangements according to the invention have the additional advantage that they permit effective cooling of the deflecting members or scoops 10 the ends 13 of which, penetrating the jet $f$, are raised to a high temperature, especially in the case in which this jet is that from a gas turbine jet propulsion engine fitted with an afterburner. In this respect the ducts 22 play the part of cooling ducts similar to those employed for the cooling of turbine blades. In order to increase the cooling of the deflecting members 10 still further, it is also possible to have recourse in conventional techniques for cooling turbine blades, such as the employment of a porous structure, cooling through evaporation, the application of a protective film, an injection in the vicinity of the leading edge, etc....

I claim:

1. A device for reducing the noise produced by a gaseous jet as it escapes from a pipe, the device comprising, distributed around the jet requiring noise reduction, a plurality of deflecting members movable between at least one operative position in which an upstream-facing part of each member penetrates into the jet in such a way as to bleed off and to deflect in a scoop-like manner a fraction of the jet, which fraction is thus given an outwardly directed transverse component of velocity, and an inoperative position in which they are retracted so as to lie outside the jet, wherein at least one of the deflecting members is equipped, in its upstream-facing part, with means to inject into the jet requiring muffling, in a direction possessing a component disposed transversely of the general direction of the said jet, a jet of pressurized auxiliary fluid.

2. A device according to claim 1, wherein said means comprise a small nozzle connected through a duct arranged within the corresponding deflecting member to a source of the pressurized fluid.

3. A device according to claim 2, wherein the deflecting member comprises a terminal surface facing towards the axis of the pipe and said nozzle terminates at a port through the said terminal surface, which port is positioned within the jet when said deflecting member is in the operative position.

4. A device according to claim 2, wherein said nozzle has the general form of a slot the direction of which is substantially peripheral.

5. A device according to claim 1, further comprising means to adjust the flow-rate of the auxiliary fluid injected into the jet.

6. An exhaust system of a propulsive jet, more especially for a gas turbine jet propulsion engine, comprising a noise-reducing device according to claim 1.

7. An exhaust system according to claim 6, wherein the pressurized auxiliary fluid is constituted by air originating in a compressor of the jet propulsion engine.

8. An exhaust system according to claim 6, the system being of the type which includes a primary nozzle from which the jet requiring noise reduction escapes, and a secondary fairing with a cross-section larger than that of the primary nozzle, the fairing partly surrounding this nozzle and extending downstream beyond the outlet orifice of the primary nozzle, wherein said deflecting members in the inoperative position retract flush into said secondary fairing.

* * * * *